United States Patent
Hedges

(10) Patent No.: US 8,760,459 B2
(45) Date of Patent: Jun. 24, 2014

(54) DISPLAY DATA MANAGEMENT TECHNIQUES

(75) Inventor: Brian J. Hedges, Hilsboro, OR (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 12/655,379

(22) Filed: Dec. 30, 2009

(65) Prior Publication Data

US 2011/0157201 A1 Jun. 30, 2011

(51) Int. Cl.
| | |
|---|---|
| G06F 13/00 | (2006.01) |
| G09G 5/36 | (2006.01) |
| G06F 3/00 | (2006.01) |
| G06F 12/00 | (2006.01) |
| G06K 9/36 | (2006.01) |
| G06K 9/54 | (2006.01) |
| G06F 1/00 | (2006.01) |
| G06F 1/26 | (2006.01) |

(52) U.S. Cl.
USPC ........... 345/545; 345/536; 345/537; 345/538; 345/547; 719/319; 711/100; 382/166; 382/232; 382/305; 713/300; 713/320; 713/323

(58) Field of Classification Search
USPC ......... 345/536–539, 543, 545–547, 555, 581, 345/619; 719/319; 711/100; 382/166, 382/232–253, 305; 380/200, 255, 269; 713/300, 310, 320–324, 330, 340
See application file for complete search history.

(56) References Cited

U.S. PATENT DOCUMENTS

| | | | | |
|---|---|---|---|---|
| 5,619,707 | A * | 4/1997 | Suboh | 713/322 |
| 2003/0048275 | A1* | 3/2003 | Ciolac | 345/544 |
| 2003/0080971 | A1 | 5/2003 | Hochmuth et al. | |
| 2005/0195205 | A1* | 9/2005 | Abrams | 345/545 |
| 2006/0164328 | A1* | 7/2006 | Jaff | 345/2.3 |
| 2007/0103477 | A1* | 5/2007 | Paquette et al. | 345/545 |
| 2009/0204957 | A1* | 8/2009 | Nishibayashi et al. | 717/172 |
| 2009/0300489 | A1* | 12/2009 | Mercer et al. | 715/273 |
| 2010/0097386 | A1* | 4/2010 | Kim et al. | 345/545 |
| 2011/0109792 | A1* | 5/2011 | Montag | 348/390.1 |

FOREIGN PATENT DOCUMENTS

| | | |
|---|---|---|
| EP | 1762928 | 3/2007 |
| WO | 2005083672 | 9/2005 |
| WO | 2006075223 | 7/2006 |

* cited by examiner

Primary Examiner — Wesner Sajous
Assistant Examiner — Andrew Shin
(74) Attorney, Agent, or Firm — Trop, Pruner & Hu, P.C.

(57) ABSTRACT

Embodiments provide techniques for generation and outputting of display data. For instance, embodiments provide features involving frame data storage within display devices. Also, embodiments provide features involving the isolation of different user contexts to different frame buffers. Further, embodiments provide efficient techniques for saving frame data upon the transitioning between power states. Moreover, embodiments provide techniques for flexibly and dynamically allocating multiple display content to a physical display.

19 Claims, 8 Drawing Sheets

DISPLAY DATA MANAGEMENT TECHNIQUES

BACKGROUND

Computer applications commonly employ graphics outputs to provide information to users. Such information may be in the form of text, diagrams, images (moving or still), and so forth. Such information is typically output on a display device connected to a processing platform (for example, a personal computer) through a communications interface.

Conventionally, the generation of graphics involves a graphics pipeline that renders display content in the form of frame data (or image data) based on directives received from applications. Upon generation, this frame data is typically stored in a frame buffer memory within the processing platform.

After this storage occurs, the frame data may be sent to a display device through a conventional display interface. Examples of such conventional interfaces include video graphics array (VGA), digital visual interface (DVI), high-definition multimedia interface (HDMI), DisplayPort (DP), and analog television formats. In turn, the display device then drives the display with the received frame data. This is based on timing that may be managed by logic that is within the processing platform or the display device.

As systems become increasingly complex, techniques for efficient and flexible management of display data are desired.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Figure 1:
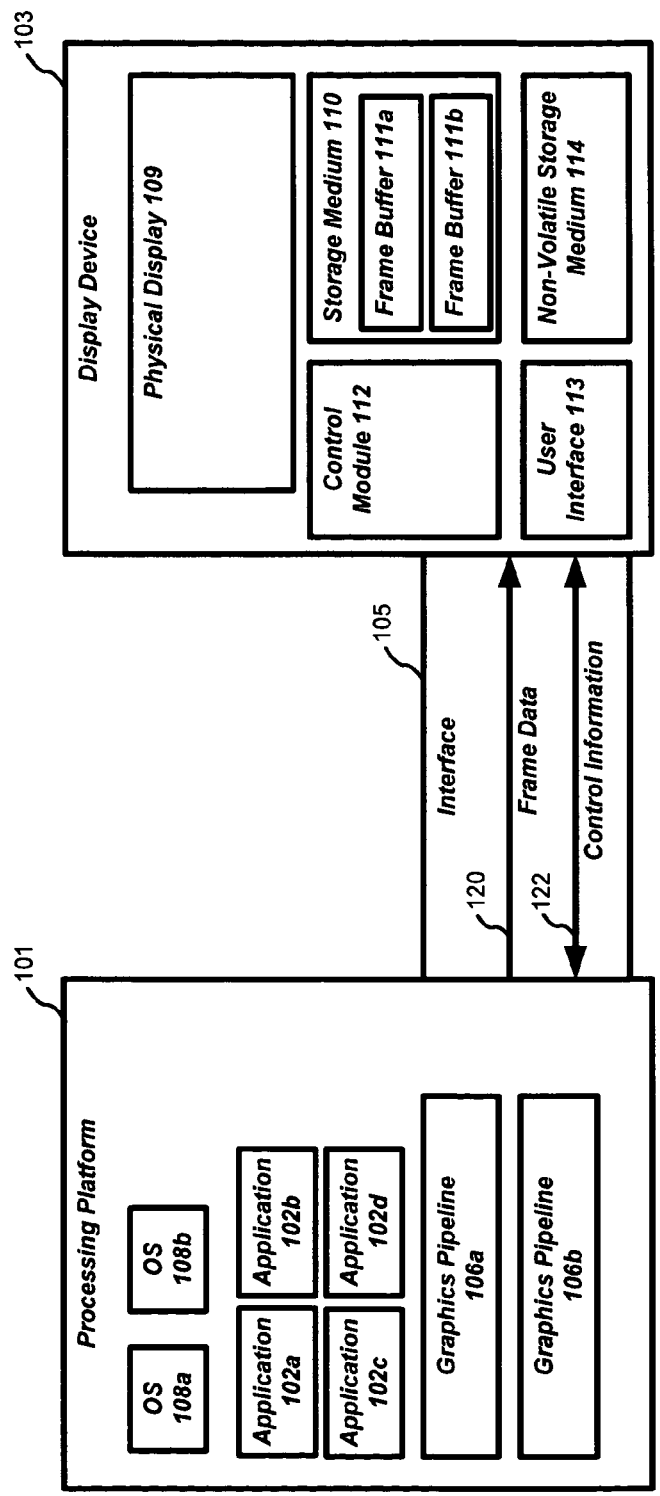
FIG. 1 is a diagram of an exemplary operational environment.

Embodiments provide techniques for the generation and outputting of display data. For instance, embodiments provide features involving frame data storage within display devices. Also, embodiments provide features involving the isolation of different user contexts to different frame buffers. Further, embodiments provide efficient techniques for saving frame data upon the transitioning between power states. Moreover, embodiments provide techniques for flexibly and dynamically allocating multiple display content to a physical display.

For instance, an apparatus may include a graphics rendering engine to generate frame data from graphics input data, and a frame buffer control module to determine whether a coupled display device includes a frame buffer. When the coupled display device includes a frame buffer, the frame buffer control module is to bypass storage of the frame data in a local frame buffer, and is to send the frame data to the coupled display device.

The frame data may include difference data between a current frame and a previous frame. Also, the frame buffer control module may select between a compressed transmission format and an uncompressed transmission format based on one or more characteristics of a communications interface (for example, but not limited to a USB interface and/or a LAN interface) with the coupled display device. These one or more characteristics may include a capacity of the communications interface. Further, the frame buffer control module may encrypt the frame data to be sent to the display device. A communications interface module to transmit the frame data across the communications interface to the coupled display device.

A method may comprise generating frame data from graphics input data; determining that a display device includes a frame buffer; and sending the frame data to the display device for storage in the frame buffer. This sending may include bypassing storage of the frame data in a local frame buffer. The frame data may include difference data between a current frame and a previous frame. Sending the frame data may include transmitting the frame data to the display device across a communications interface.

Also, the method may encrypt the frame data to be transmitted across the communications interface. Also, the method may select between a compressed transmission format and an uncompressed transmission format based on one or more characteristics of the communications interface. The one or more characteristics of the communications interface may include a capacity of the communications interface.

An article may comprise a machine-accessible medium having stored thereon instructions that, when executed by a machine, cause the machine to: generate frame data from graphics input data; determine that a display device includes a frame buffer; and send the frame data to the display device for storage in the frame buffer. This sending may comprise bypassing storage of the frame data in a local frame buffer.

A system may include a processing platform, and a display device. The processing platform includes a graphics rendering engine to generate frame data from graphics input data, and a frame buffer control module to determine whether the display device includes a frame buffer. When the display device includes a frame buffer, the frame buffer control module is to bypass storage of the frame data in a local frame buffer, and is to send the frame data to the display device.

A further system may include a processing platform, and a display device. The processing platform has a first graphics pipeline to generate first frame data for a first set of one or more applications; and a second graphics pipeline to generate second frame data for a second set of one or more applications. The display device includes a first frame buffer and a second frame buffer. The first graphics pipeline is to send the first frame data to the first frame buffer. Also, the second graphics pipeline is to send the second frame data to the second frame buffer.

The display device may comprise a physical display and a user interface. The user interface may receive a user selection of one of the first and second frame buffers. The physical display is to output frame data in the selected frame buffer.

The first set of one or more applications may correspond to a first operating system, and the second set of one or more applications may correspond to a second operating system.

The system may further include a communications interface between the processing platform and the display device. The processing platform may send the first frame data across the communications interface through a first connection; and send the second frame data across the communications interface through a second connection. These first and second connections may be isolated. The communications interface may be a USB interface or a LAN.

A further method may include: generating first frame data for a first set of one or more applications; generating second frame data for a second set of one or more applications; sending the first frame data to a first frame buffer in a display device; sending the second frame data to a second frame buffer in the display device; and based on a user selection, outputting one of the first frame data and the second frame data to a physical display. The first set of one or more applications may correspond to a first operating system, and the second set of one or more applications may correspond to a second operating system. Sending the first frame data may comprise transmitting the first frame data through a first connection of a communications interface, and sending the second frame data may comprise transmitting the second frame data through a second connection of the communications interface. The first and second connections may be isolated from each other.

A display device may include a volatile storage medium to store frame data (e.g., in one or more frame buffers); a non-volatile storage medium; and a control module to save the frame data in the non-volatile storage medium based on a transition to a lower power state. This lower power state may be a sleep state. The transition to the lower power state may be based on a directive received from a coupled processing platform. The control module may restore the frame data into the volatile storage medium based on a transition from the lower power state to a higher power state. The volatile storage medium may comprise dynamic random access memory (RAM), and the non-volatile storage medium may comprise flash memory.

Yet a further method may include: storing frame data in a frame buffer, the frame buffer included in a display device and comprising a volatile storage medium; based on a transition to a lower power state (e.g., a sleep state), saving the frame data in a non-volatile storage medium included in the display device. Also, the method may include receiving from a processing platform a directive for the transition to the lower power state. The method also may include transitioning from the lower power state to a higher power state, and based on the transitioning, restoring the frame data into the frame buffer.

Still a further method includes: receiving a user selection to output one or more frame data streams to a physical display; based on the user selection, allocating one or more frame buffer storage portions of a local storage medium, the one or more frame buffer storage portions corresponding to the one or more frame data streams; receiving the one or more frame data streams from the processing platform; storing the one or more received frame data streams in a storage medium, the storing in accordance with the allocating; and outputting the one or more received frame data streams to a physical display in accordance with the user selection.

Allocating the one or more frame buffer storage portions of the local storage medium comprises generating a frame mapping table (FMT). Also, the method may comprise storing the FMT in the local storage medium. The method may further comprise: determining a resolution for each of the one or more frame data streams; and indicating, to the processing platform, the resolution for each of the one or more frame data streams.

Receiving the one or more frame data streams from the processing platform may comprise receiving each of the one or more frame data streams in accordance with the corresponding determined resolution. Also, receiving the one or more frame data streams from the processing platform comprises receiving the one or more frame data streams across a communications interface. Further, each of the one or more data streams may be received through a corresponding connection in the communications interface.

The above features are illustrative. Thus, embodiments are not limited to these features. Further features of embodiments will become apparent from the following description and accompanying drawings.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a diagram of an exemplary operational environment 100, which may employ the techniques described herein. Environment 100 may include various elements. For instance, FIG. 1 shows environment 100 including a processing platform 101, a display device 103, and an interface 105. These elements may be implemented in any combination of hardware and/or software.

Processing platform 101 includes may include one or more operating systems (OSs). For example, FIG. 1 shows processing platform 101 running operating systems 108a and 108b. However, any number of operating systems may be employed. Through these operating systems, various computer applications may be executed. For example, FIG. 1 shows processing platform 101 executing applications, 102a-d. Each of these applications may execute under a respective one of OSs 108a-b.

Applications 102a-d employ graphics that are output on one or more displays (such as on display device 103). Exemplary applications include various business-related applications (e.g., word processors, spreadsheet applications, presentation applications, e-mail, messaging applications, etc.), gaming applications, video applications, and/or other applications.

Processing platform 101 may further include one or more graphics pipelines. For instance, FIG. 1 shows processing platform 101 including graphics pipelines 106a and 106b. However, any number of graphics pipelines may be employed. These graphics pipelines provide graphics operations for applications 102a-d. In embodiments, this be handled through one or more graphics application programming interfaces (APIs) (not shown). Such APIs may provide various routines, data structures, object classes, and/or protocols that interface with graphics pipelines 106a-b. Exemplary APIs include (but are not limited to) commercially available APIs, such as OpenGL, DirectX, and others.

In particular, graphics pipelines 106a-b perform graphics operations in response to directives received and processed through the graphics APIs. Exemplary operations include rendering and outputting images (frames) to display device 103. As described above, graphics pipelines 106a-b may be implemented in any combination of hardware and/or software. Thus, in embodiments, graphics pipelines 106a-b may be implemented with one or more graphics processing units (GPUs).

FIG. 1 shows that display device 103 includes a physical display 109, a storage medium 110, a control module 112, a user interface 113, and a non-volatile storage medium 114.

Physical display 109 provides a visual output to a user. In embodiments, this output is in the form of sequential images (or frames). Accordingly, exemplary physical displays include light emitting diode (LED) displays, liquid crystal displays (LCDs), plasma displays, and cathode ray tube (CRTs). Embodiments, however, are not limited to these examples.

Each of the frames output by physical display 109 may comprise multiple pixels. Data representing these pixels (e.g., color and/or intensity values) are stored in a frame buffer within storage medium 110. This data may be referred to as "frame data". Thus, by storing frame data, the frame buffer "drives" physical display 109.

In embodiments, display device 103 may provide multiple frame buffers. For instance, FIG. 1 shows display device 103 including frame buffers 111a and 111b. However, any number of frame buffers may be employed. These frame buffers may be included in storage medium 110. Storage medium 110 may comprise volatile random access memory (RAM) (e.g. dynamic RAM). However, other types of storage media, such as non-volatile memory, may be employed.

In embodiments, display device 103 receives frame data from processing platform 101. More particularly, graphics pipelines 106a-b (through interface 105) may deliver frame data 120 to display device 103. Upon receipt, display device 103 stores the frame data in frame buffers 111a and/or 111b. In turn, this stored frame data may be output by physical display 109 according to the techniques described herein.

As described above, display device 103 includes a control module 112, which directs various operations of display device 103. Such operations include the reception, storage, and outputting of frame data received from processing platform 101. Accordingly, control module 112 may handle communications with interface 105, display timing, power management procedures, and so forth. Also, control module 112 may manage user interactions through user interface 113 or through the control path 122 to a virtualization control software stack.

User interface 113 allows a user to interact with display device 103. This interaction may involve the user performing various operations described herein. Such operations include (but are not limited to) selecting a frame buffer within display device 103 for output, selecting a single frame buffer output mode or a multiple frame buffer output mode, and applying and removing operational power for display device 103. User interface 113 may be implemented in various ways. For example, user interface 113 may include various buttons, keys, dials, and/or other input devices. Additionally or alternatively, user interface 113 may include various menus and/or touch screen features provided through physical display 109.

In embodiments, display device 103 may include non-volatile storage medium 114 (e.g., flash memory). As described in further detail below, non-volatile storage medium 114 may provide storage for the contents of frame buffers 111a-b when display device 103 transitions between power states (e.g., from a higher power state to a lower power state). Alternatively, embodiments may provide such features by implementing frame buffers 111a-b with non-volatile memory so that it is always available and retains its content.

Interface 105 is coupled between processing platform 101 and display device 103. In particular, interface 105 allows for processing platform 101 to provide display device 103 with frame data 120. Interface 105 also allows for processing platform 101 and display device 103 to exchange control information 122 with each other.

Interface 105 may be implemented in various ways. For example, in embodiments, interface 105 may include a "plug and play" interface, such as a Universal Serial Bus (USB) interface (e.g., USB 1.0, USB 2.0, USB 3.0, and so forth). However, various other serial and/or parallel interfaces may be employed. Moreover, interface 105 may be implemented with a wired local area network (LAN) (such as an Ethernet network). Further, interface 105 may be implemented with a wireless network. Exemplary wireless networks includes IEEE 802.11 wireless LAN (WiFi) networks, IEEE 802.16 WiMAX networks, and wireless personal area networks (WPANs) (e.g., 60 GHz WPANs). Embodiments, however, are not limited to these examples.

In embodiments, frame buffers 111a-b of display device 103 appear as "the display" to processes and/or operating systems within processing platform 101. Thus, in embodiments, the processes and/or operating systems are not aware of physical display 109 of display device 103. Moreover, in embodiments, a user or an independent software stack manages how frame buffers within display device 103 are actually viewed on physical display 109. For instance, embodiments provide users or software the ability to page or "flip" through various frame buffers. Alternatively or additionally, embodiments allow users or software to map various frame buffers to various independent areas on physical display 109 so that multiple frames may be viewed at the same time.

In embodiments, the elements of FIG. 1 may be implemented as a computer system. For example, processing platform 101 may be a personal computer, and display device 103 may be its corresponding monitor. Embodiments, however, are not limited to such arrangements.

Moreover, the elements of FIG. 1 may include one or more processors (e.g., microprocessors). For instance, processing platform may comprise any combination of microprocessors. As an example, operations described herein (such as operations of OSs 108a-b, applications 102a-d, and graphics pipelines may be provided by central processing unit(s) CPU(s) and/or graphics processing unit(s) GPU(s). These CPU(s) and/or GPU(s) may operate in accordance with instructions (e.g., software) stored in a storage medium. This storage medium (which may be included in processing platform 101) may include memory (volatile or non-volatile), disk storage, etc. Accordingly, display device 103 may also include one or more processors to provide the features described herein. Such processors may execute instructions (e.g., software) stored in a storage medium. This storage medium (which may be included in display device 103) may include memory (volatile or non-volatile), disk storage, etc. Further details regarding such implementations are provided below.

Operations for various embodiments may be further described with reference to the following figures and accompanying examples. Some of the figures may include a logic flow. Although such figures presented herein may include a particular logic flow, it can be appreciated that the logic flow merely provides an example of how the general functionality described herein may be implemented. Further, the given logic flow does not necessarily have to be executed in the order presented unless otherwise indicated. In addition, the given logic flow may be implemented by hardware element(s), software element(s) executed by one or more processors, or any combination thereof. Embodiments are not limited to this context.

The traditional graphic/video process pipeline involves display content being rendered to a system frame buffer memory within a processing platform, and then the render data (frame data) being sent to a display device through a conventional display interface. Examples of such conventional interfaces include video graphics array (VGA), digital visual interface (DVI), high-definition multimedia interface (HDMI), DisplayPort (DP), and analog television formats. In turn, the display device then drives the display with the received frame data. This is based on timing that may be managed by logic that is within the processing platform or the display device.

Recently an approach has been developed that intercepts a current frame from a processing platform's frame buffer. The intercepted frame is read and compared to a previous frame. Based on this comparison, a difference ("delta") is determined. This delta (which provides lossless compression) is then sent to a display device across a common interface, such as a USB or Ethernet interface.

Upon receipt, the display device uses its internal logic to uncompress the delta and store the uncompressed data in its own frame buffer. In addition, the display device may handle various operations, such as local display screen refresh, scaling, rotation and display on/off. Since these techniques use common interfaces, several display devices may be supported (limited to the processing platform's frame buffer size and its processing bandwidth).

Unfortunately, these intercept, read, and comparison operations (which are performed by the processing platform) require a substantial amount of the processing platform's processing capacity. For instance, high action video can require substantially all of a typical processing platform's (e.g., a personal computer's) processing capacity.

Thus, this approach exhibits various drawbacks. One drawback is that the processing platform is unaware of the frame buffer intercepts, and does not take advantage of the remote frame buffer. As a result, the processing platform wastes processing bandwidth and power by building and maintaining its own frame buffer in local global memory.

A further drawback of this approach is that the interception and reading of the processing platform's frame buffer (e.g., by third party frame scrapping software) is a security hole. This is because such third party software could capture any frame content (such as content containing personal data) and send it anywhere. Thus, such frame scrapping is likely to be disallowed in the future.

Embodiments overcome such shortcomings by taking advantage of displays that have integrated frame buffers. For instance, in embodiments, processing platforms may have graphics pipeline(s) that comprehend a remotely located frame buffer and include the remote frame as part of the overall graphic process pipeline and assure content is secure from creation to display. The remote frame buffer may be attached through any digital interface and if the content requires to be encrypted the appropriate encryption method of the interface will be adopted.

By including the concept of a remote frame buffer, processing platforms may offer only the frame to frame delta data, thus eliminating the need for the aforementioned frame to frame comparison operations. Further, embodiments may determine whether to compress or not compress such data before sending it across the interface. This determination may be based on the interface's available bandwidth. For instance, compression may be employed for USB 1.0 and USB 2.0 interfaces, but not for USB 3.0 interfaces.

Figure 2:
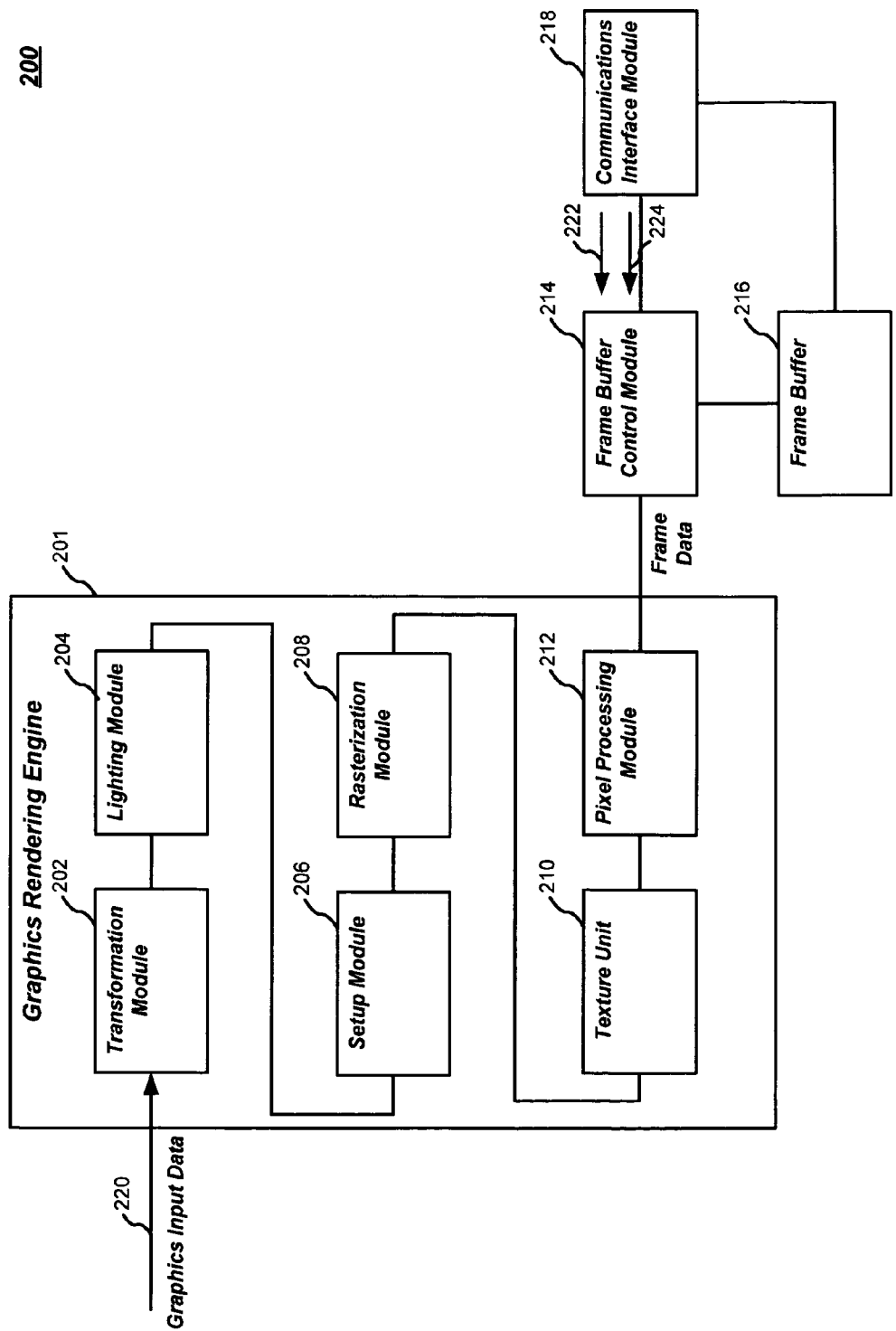
FIG. 2 is a diagram of an exemplary graphics pipeline implementation.

FIG. 2 is a diagram of an exemplary implementation 200 that may be included in a graphics pipeline, such in as any of the graphics pipelines of FIG. 1. This implementation may include various elements. For purposes of illustration (and not limitation), FIG. 2 shows a graphics rendering engine 201, a frame buffer control module 214, a frame buffer 216, and a communications interface module 218. These elements may be implemented in any combination of hardware and/or software.

Graphics rendering engine 201 generates frame data from graphics input data 220. Graphics rendering engine 201 may be implemented in various ways. FIG. 2 shows graphics rendering engine 201 including a transformation module 202, a lighting module 204, a setup module 206, a rasterization module 208, a texture unit 210, a pixel processing module 212

As shown in FIG. 2, graphics rendering engine 201 receives graphics input data 220 at transformation module 202. Graphics input data 220 comprises representations of a scene in a model space (e.g., a three-dimensional space). In embodiments, graphics input data 220 may be received from one or more applications (e.g., through graphics API(s)).

Transformation module 202 converts coordinates in graphics input data 220 from the model space to a screen space. In addition, transformation module 202 performs operations, such as clip testing and any clipping operations.

Lighting module 204 computes vertex colors based on a vertex normal and pre-specified material colors. It may optionally involve a color per vertex. Setup module 206 computes the slopes of the edges of primitives as well as the gradients (changes in the X and Y directions) of the depth, color, and texture parameters.

Rasterization module 208 finds all valid pixel samples for primitives and computes the correct depth, color and texture value at each sample point. Texture unit 210 looks up one or more texel values from texture memory and performs texture-specific blend operations on the incoming pixel color.

Pixel processing module 212 performs operations that occur once per pixel, such as depth compare, pixel blend, and other similar operations. As a result, pixel processing module 212 provides frame buffer control module 214 with pixel data that represents the contents of a single screen image.

Frame buffer control module 214 performs operations regarding the storage of the pixel data. For instance, frame buffer control module 214 determines whether to store the pixel data locally in frame buffer 216, or whether to send the pixel data to a frame buffer in a display device (such as display device 103).

Communications interface module 218 provides access to an interface that connects to a display device (such as interface 105 of FIG. 1). For instance, communications interface module 218 may provide the interface with pixel data (received either from frame buffer 216, or directly from frame buffer control module 214). Also, communications interface module 218 may receive (through the interface) control information provided by the display device. Such control data may indicate whether the display device has frame buffer(s). In embodiments, the control data may be in a data structure that describes the display device's capabilities, such as an extended display identification data (EDID) structure. However, other data formats may be employed.

As shown in FIG. 2, communications interface module 218 provides frame buffer control module 214 with such control information. For example, FIG. 2 shows communications interface module 218 providing frame buffer control module 214 with a frame buffer indicator 222, and an interface capacity indicator 224. Frame buffer indicator 222 indicates whether the display device includes a frame buffer. Interface capacity indicator 224 indicates the capacity ("bandwidth") of the processing platform's interface with the display device. In embodiments, this indicator may specify the interface type (e.g. USB 1.0, USB 2.0, USB 3.0, etc.). However, other indications of capacity may be employed.

Based on these indicators, frame buffer control module 214 determines how to handle generated frame data. For example, if the connected display device does not have an integrated frame buffer, it stores the generated frame data locally in frame buffer 216. Accordingly, such locally stored frame data will be sent to the display device in accordance with a conventional display interface technique (e.g., VGA, DVI, HDMI, DP, television, etc.).

In contrast, if the connected display device has an integrated frame buffer, then frame buffer control module 214 sends the frame data (e.g., a "delta" or difference from a previous frame) to the display device (via interface module 214 and the connected interface) for storage in its integrated frame buffer. This frame data is sent based on the interface's capacity. For example, for higher capacity interfaces, the frame data (e.g., delta) may be sent in an uncompressed format. However, for lower capacity interfaces, the frame data (e.g., delta) may be sent in a compressed format. Embodiments, however, are not limited to this example.

Moreover, frame buffer control module 214 may encrypt the frame data to be sent across the interface (through communications interface module 218). Various encryption techniques may be employed, such as standard encryption mechanism(s) employed by the interface between the processing platform and the display device. Accordingly, the display device (e.g., its control module) may decrypt such data upon receipt.

Figure 3:
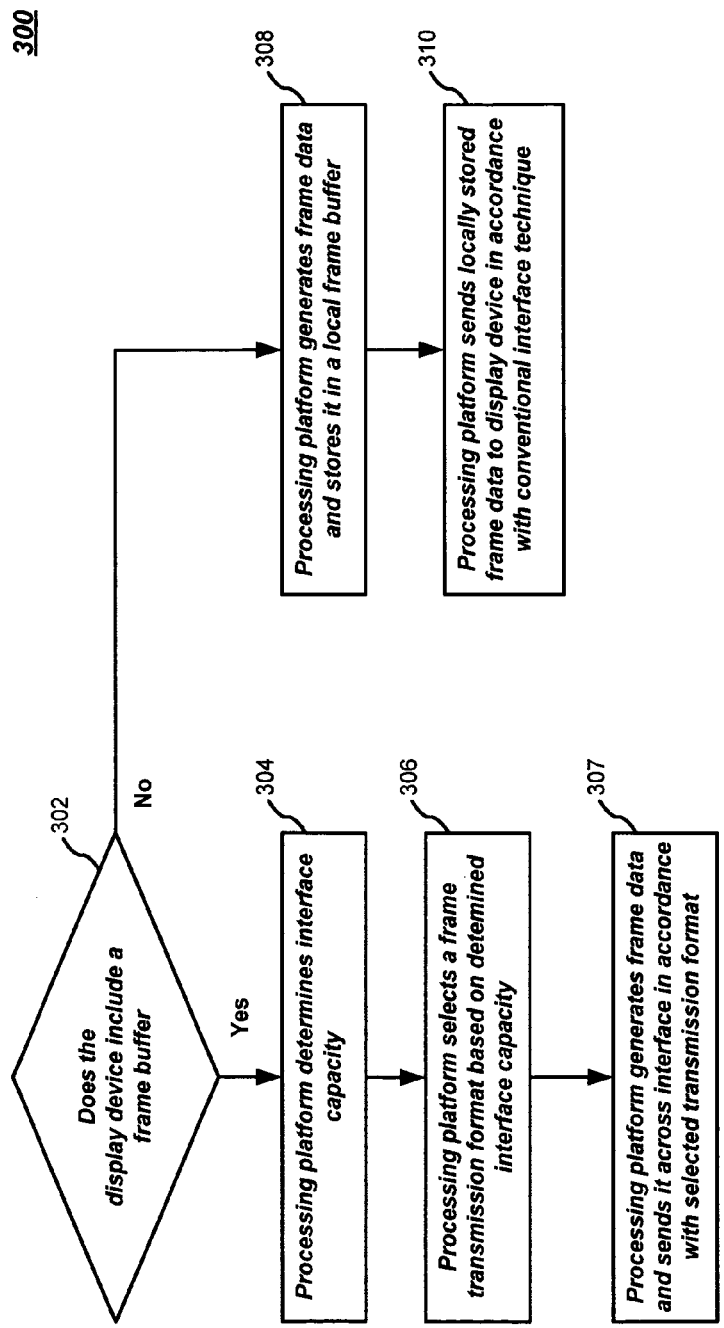
FIG. 3 is a flow diagram.

FIG. 3 is a diagram of a logic flow 300, which may be representative of operations executed by one or more embodiments. This flow involves a processing platform having one or more graphics pipelines, and a display device having one or more frame buffers. Thus, this flow may be performed by the elements of FIG. 1. However, embodiments are not limited to this context. Although FIG. 3 shows a particular sequence, other sequences may be employed. Also, the depicted operations may be performed in various parallel and/or sequential combinations.

At a block 302, the processing platform (e.g., processing platform 101) determines whether the display device has an integrated frame buffer. In embodiments, this may comprise receiving control information (e.g, an EDID) from the display device. If so, then operation proceeds to a block 304. Otherwise, operation proceeds to a block 308.

At block 304, the processing platform determines the capacity (bandwidth) of the interface. Based on this, the processing platform determines a transmission format for frame data at a block 306. For example, for lower capacities, the processing platform may determine that it is to employ a compressed transmission format for frame data. However, for higher capacities, the processing platform may determine that it is to employ an uncompressed transmission format for frame data.

In embodiments, capacity may be determined by the type of interface being employed. For instance, USB 1.0 and USB 2.0 interfaces may be considered lower capacity interfaces (that entail a compressed transmission format). In contrast, USB 3.0 and LAN (e.g., Ethernet) interfaces may be considered higher capacity interfaces (that entail an uncompressed transmission format. Embodiments, however, are not limited to these examples.

Thus, at a block 307, the processing platform generates frame data and sends it across the interface to the display in accordance with the selected transmission format.

As described above, block 308 is performed if the display device does not have an integrated frame buffer. Accordingly, at block 308, the processing platform generates frame data and stores it in its own frame buffer. In the context of FIG. 2, this may comprise frame buffer control module 214 storing frame data generated by implementation 200 in frame buffer 216.

Following this, a block 310 is performed, in which the processing platform sends the locally stored frame data to the display device in accordance with a conventional display interface technique (e.g., VGA, DVI, HDMI, DP, television, etc.).

As described above, embodiments may provide multiple frame buffers within a display device (such as display device 103). For example, FIG. 1 shows display device 103 having frame buffers 111a and 111b. Complete isolation between such multiple frame buffers may be maintained. Thus, each frame buffer in the display device may be assigned to various process(es) or operation(s). For instance, each frame buffer may be assigned to a particular OS, or to one or more particular applications. Further, as described above, processing platforms (such as processing platform 101) may include multiple graphics pipelines. In embodiments, each of such multiple pipelines may be directed to a corresponding display device frame buffer.

Figure 4:
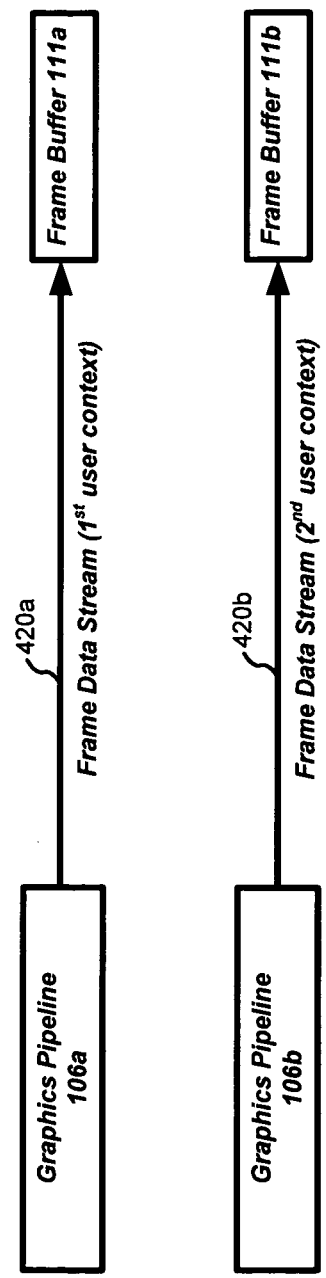
FIG. 4 is a diagram showing a mapping between graphics pipelines and frame buffers.

FIG. 4 is a diagram showing an exemplary distribution of frame data in the context of FIG. 1. In particular, FIG. 4 shows graphics pipeline 106a providing frame data stream 420a to frame buffer 111a, and graphics pipeline 106b providing frame data stream 420b to frame buffer 111b. With reference to FIG. 1, these frame data streams may be part of frame data 120 and control information 122. In embodiments, frame data streams 420a and 420b may be sent through different connections (e.g., isolated connections) provided by interface 105. Alternatively, a same connection may be used for all frame data. However, within such a connection, frame data transmissions are tagged for their appropriate frame buffers by the source (e.g., processing platform). The employed tagging scheme may be determined through user selection at the display device. Thus, in embodiments, isolation may be attained by the display device (e.g., a control module within the display device).

Frame data streams 420a and 420b may correspond to different user contexts (e.g., different processes or operations of processing platform 101). For example, frame data stream 420 may correspond to processes (e.g., applications) of a first operating system running on processing platform 101, while frame data stream 422 may correspond to processes (e.g., applications) of a second operating system running on processing platform 101. Also, frame data stream 420 may correspond to a first group of one or more applications, while frame data stream 422 may correspond to a second group of one or more applications. These groups of applications may be distributed in any manner among one or more operating systems. In embodiments, particular applications or operating systems may only be aware of their corresponding frame buffer.

Embodiments may provide isolation between frame data streams. This isolation may be provided through multiple connections provided by an interface. For instance, in the context of USB interfaces, each frame data stream (and its corresponding control information) may be exchanged across one or more USB pipes. However, other interfacing and/or isolation techniques may be employed. Moreover, each frame buffer within display device 103 may be "locked" to a particular frame data stream so it cannot be reassigned without proper user credentials.

This approach may advantageously provide a convenient way for a user to switch back and forth between different content being displayed on a display device. Also, this approach provides a secure path for personal content. For instance, this approach allows a secure OS and a User OS to share a monitor (display device). Moreover, this approach may allow for quick switching between environments without complex memory swapping or mapping.

Figure 5:
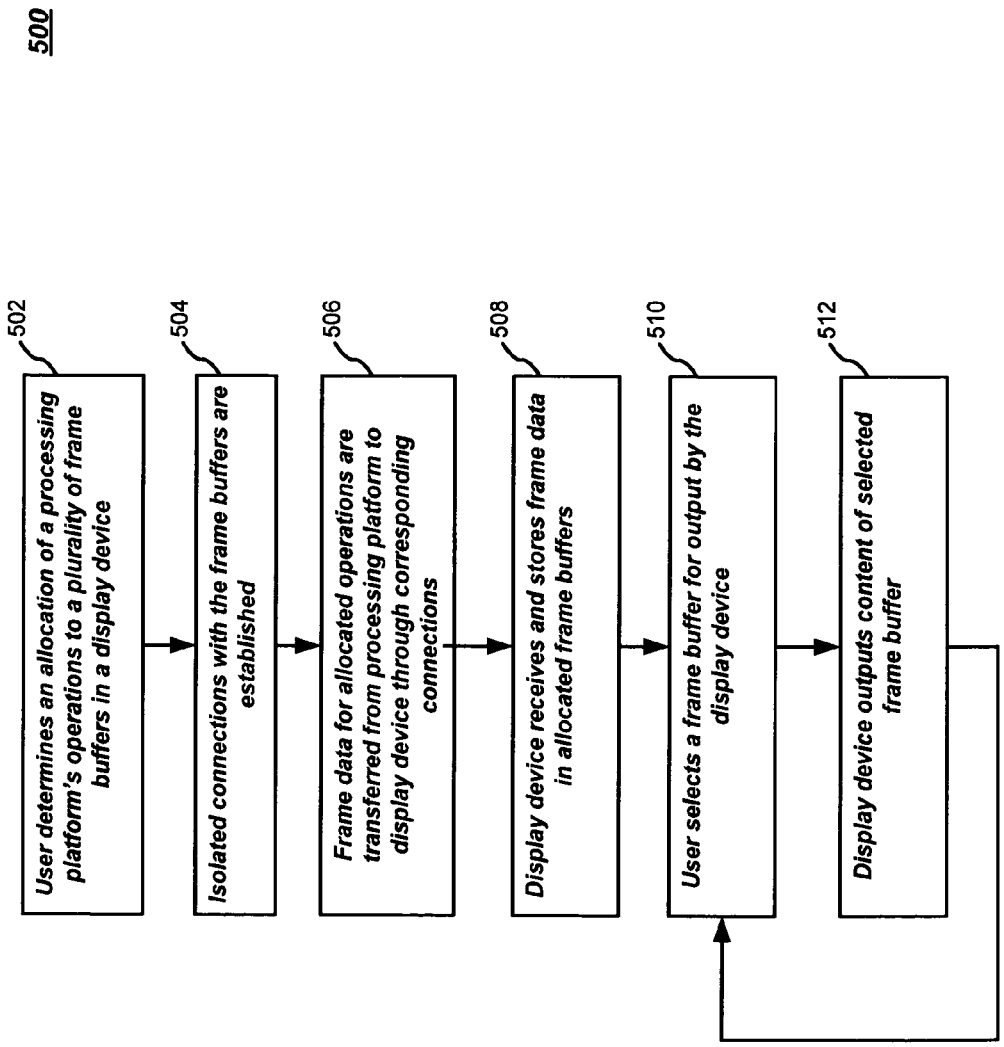
FIGS. 5 and 6 are flow diagrams.

FIG. 5 is a diagram of a logic flow 500, which may be representative of operations executed by one or more embodiments. This flow involves a processing platform and a display device. Thus, this flow may be performed by the elements of FIG. 1. However, embodiments are not limited to this context. Although FIG. 5 shows a particular sequence, other sequences may be employed. Also, the depicted operations may be performed in various parallel and/or sequential combinations.

At a block 502 a user determines an allocation of a processing platform's operations to a plurality of frame buffers in a display device. For example, the user may allocate processes of a first operating system to a first frame buffer, and processes of a second operating system to a second frame buffer.

At a block 504, isolated connections with the frame buffers are established for each of the allocations. For instance, one or more USB pipes may be established for each of the allocations. Alternatively, one or more Internet protocol (IP) tunnels may be established for each of the allocations.

Thus, at a block 506, frame data for the allocated operations are transferred across their corresponding connection(s) to the display device. This data is received and stored at their allocated frame buffers within the display device at block 508.

At a block 510, the user selects a frame buffer for output by the display. In embodiments, this may involve the user interacting with a user interface of the display device. However, embodiments are not limited to this example. Based on this selection, the display device outputs the contents of the selected frame buffer at a block 512. As indicated in FIG. 5, operation may return to block 510, where the user changes the frame buffer selection for output at block 512.

As described above, embodiments may provide a display device having frame buffer(s) and a non-volatile storage medium. For example, FIG. 1 shows display device 103 including frame buffers 111a-b and non-volatile storage medium 114. This feature allows for the effective handling of power states. For instance, when transitioning into a lower power state (e.g., a power suspend state), the display device may save the contents of its frame buffer(s) into the non-volatile storage medium. Conversely, upon the return to a higher power state, the display device may write the saved contents back into its frame buffers.

Such features advantageously overcome shortcomings of conventional approaches. For example, conventional approaches do not provide such non-volatile storage in display devices. Moreover, for display devices having frame buffers, conventional approaches do not maintain frame buffer in the corresponding processing platform. Thus, for a display device to enter such a low power state (e.g., a power suspend state), the processing platform would have to read the frame buffer contents back from the display device and save these contents in its own non-volatile storage medium. Unfortunately, this may consume excessive energy and time.

Figure 6:
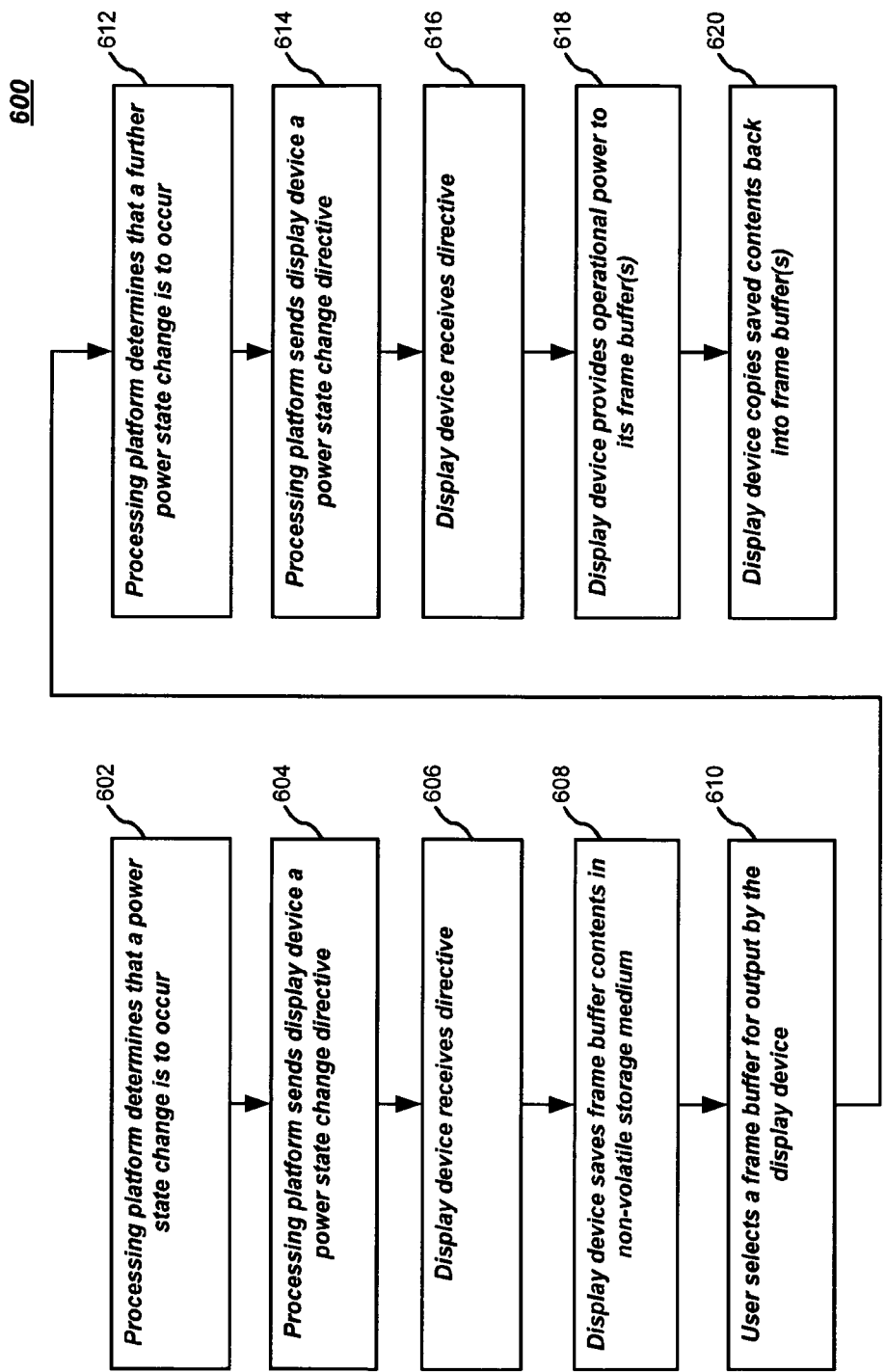

FIG. 6 is a diagram of a logic flow 600, which may be representative of operations executed by one or more embodiments. This flow involves a processing platform, a display device having one or more frame buffers and a non-volatile storage medium. Thus, this flow may be performed by the elements of FIG. 1. However, embodiments are not limited to this context. Although FIG. 6 shows a particular sequence, other sequences may be employed. Also, the depicted operations may be performed in various parallel and/or sequential combinations.

At a block 602, the processing platform determines that a power state change (e.g., a system sleep event) is to occur. In particular, the processing platform determines that a transition from a first (higher) power state to a second (lower) power state is to occur. This determination may be based on the occurrence of one or more triggering conditions (e.g., user inactivity, low battery level, etc.). In embodiments, the system sleep event may be a C3 or C4 sleep state in accordance with the Advanced Configuration and Power Interface (ACPI) specification. Embodiments, however, are not limited to these exemplary states.

Based on this determination, the processing platform (at a block 604) sends a power state change directive to the display device. In the context of FIG. 1, such a directive may be exchanged across interface 105 as control information 122.

The display device receives this directive at a block 606. In turn, the display device determines that operational power to its frame buffer(s) is to be suspended. Accordingly, at a block 608, the display device saves the contents of these buffer(s) (e.g., frame data) in its non-volatile storage medium. Following this, the display device may enter the directed power state at a block 610. In the context of FIG. 1, performance of blocks 606-610 may be managed by control module 112.

At a block 612, the processing platform determines that a further power state change is to occur. In particular, the processing platform determines that a transition from the second (lower) power state into a higher power state is to occur. In embodiments, this may be a return to the first power state. Alternatively, this may be a transition to a different higher power state.

Accordingly, at a block 614, the processing platform sends a directive to the display device. With reference to FIG. 1, this directive may be sent across interface 105 as control information 122.

The display device receives this directive at a block 616. Upon receipt, the display device provides operational power to its frame buffer(s) at a block 618. In turn, at a block 620, the display device copies the saved contents from the non-volatile memory back into its frame buffer(s). Thus, the frame data is restored in its frame buffer(s). In the context of FIG. 1, performance of blocks 616-620 may be managed by control module 112.

As described herein, embodiments may provide display devices having integrated frame buffers. This may be implemented in a local display frame memory. Also, in embodiments, a display device (e.g., display device 103) may have a frame map table (FMT) to its local display frame memory. The FMT may manage this memory so it can be partitioned into multiple independent frame buffers that are mapped to a single physical display.

This feature advantageously allows a large display to be selectively used as one viewing experience, or as a "split screen", providing a multiple independent displays experience. For instance, a user could split the screen into half (e.g., either horizontally or vertically) to get an experience of independent displays. Moreover, the user may dynamically switch between a single display experience and a multiple independent displays experience.

It is said that productivity increases by 50% for each monitor added to a business system. Thus, this feature advantageously provides a user to get the multi-monitor experience with one monitor. Thus, this feature advantageously saves desk space.

Also, the FMT may include tag fields associated with blocks of the display frame memory that protect blocks from each other and allows the memory to be allocated to different operating systems, applications, and/or users.

In embodiments, the FMT is managed through a user interface on the display device. This is different than a window environment because management of the FMT is independent of user interfaces provided by the corresponding processing platform (e.g., processing platform 101).

Such user selections (e.g., multi-monitor and single-monitor) entail different output resolutions. Thus, to provide this feature, the display device furnishes the processing platform with resolution information (based on the user's selection) across the interface connecting these elements (e.g., interface 105). This resolution information may be provided in various formats, such as in EDID data structure(s).

Upon receipt of this information, the processing platform (e.g., its graphics pipeline(s)) determines the appropriate resolution(s), and generates frame data in accordance with these resolution(s).

Figure 7:
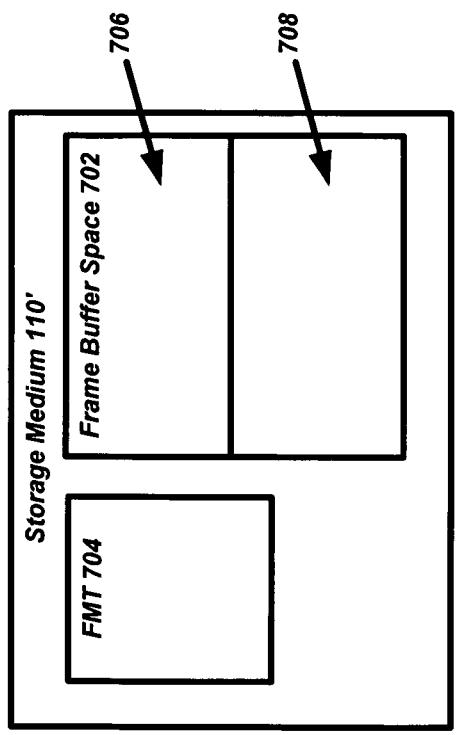
FIG. 7 is a diagram of a frame mapping memory implementation.

As described above, with reference to FIG. 1, display device 103 includes a storage medium 110 that provides a first frame buffer 111a and a second frame buffer 111b. FIG. 7 is a diagram of an alternate arrangement that employs an FMT. In particular, FIG. 7 shows a storage medium 110', which may be used in display devices, such as display device 103.

As shown in FIG. 7, storage medium 110' includes a frame buffer space 702 that may be flexibly allocated to provide one or more frame buffers. This flexible allocation is determined by FMT 704. For instance, FIG. 7 shows that FMT 704 allocates frame buffer space 702 into a first frame buffer portion 706 and a second frame buffer portion 708. However, in embodiments, FMT 704 may allocate frame buffer space 702 into a single frame buffer portion or any plurality of frame buffer portions.

Figure 8:
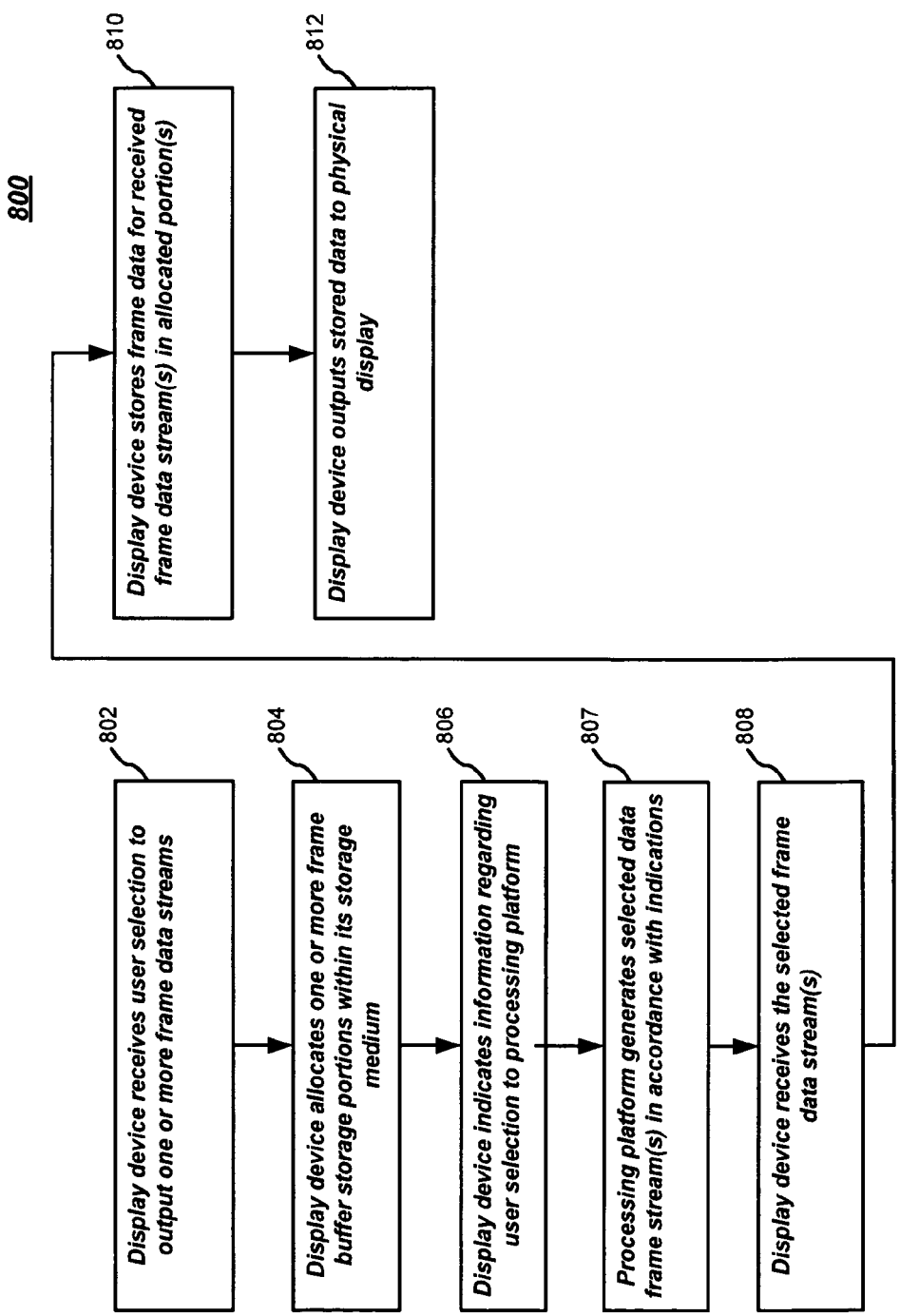
FIG. 8 is a flow diagram.

FIG. 8 is a diagram of a logic flow 800, which may be representative of operations executed by one or more embodiments. This flow involves a processing platform, a display device having one or more frame buffers and a non-volatile storage medium. Thus, this flow may be performed by the elements of FIG. 1. However, embodiments are not limited to this context. Although FIG. 8 shows a particular sequence, other sequences may be employed. Also, the depicted operations may be performed in various parallel and/or sequential combinations.

At a block 802, the display device receives a user selection to output one or more display data streams to it physical display. For example, the user selection may be to output a single frame data stream (single monitor experience). Alternatively, the user selection may be to output multiple frame data streams (multiple monitors experience). Moreover, the user selection may indicate output formats (e.g., side-to-side, top-to-bottom tiling, etc.). This user selection may be received through the display device's user interface (e.g., through user interface 113 of FIG. 1).

Based on the user selection, the display device allocates (at a block 804) frame buffer storage portions within its storage medium. For example, in the context of FIG. 7, these portions may be within frame buffer space 702. Further, this allocation may involve generating an FMT.

At a block 806, the display device indicates information to the processing device regarding the user selection. This information may indicate the selected frame data streams. Also, this information may indicate resolution information (based on the user selection). In embodiments, this information may be sent across the interface between the processing platform and the display device (e.g., interface 105).

At a block 807, the processing platform receives the information sent at block 806. Based on this information, the processing platform generates the selected frame data stream(s) in accordance with the received indications (e.g., in accordance with the indicated resolution(s)). Also, the processing platform sends the selected frame data streams across the interface. As described herein, each frame data stream may be sent across a corresponding connection (e.g., isolated connection) provided by the interface.

The display device receives the selected frame data streams at a block 808. In turn, the display device stores the frame data in the corresponding allocated portion(s) of its storage medium at a block 810.

From this, the display device outputs the selected frame data stream(s) in accordance with the user selection at a block 812.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a tangible machine-readable medium (storage medium) or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium (storage medium) or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method comprising:
generating frame data from graphics input data;
determining if a display device includes a frame buffer;
sending the frame data to the display device for storage in the frame buffer;
determining an allocation of a processing platform's operations to a plurality of frame buffers in a display device by allocating processes of a first operating system to a first frame buffer and processes of a second operation system to a second frame buffer;
selectively allocating a frame buffer space into a selected number of spaces to implement a selected number of independent frame buffers within said frame buffer space;
saving frame buffer contents to a non-volatile storage medium in response to receiving a power state change; and
copying saved contents from said non-volatile storage medium back into the frame buffer of the display device in response to a subsequent power state change.

2. The method of claim 1, wherein the frame data comprises difference data between a current frame and a previous frame.

3. The method of claim 1, wherein said sending comprises transmitting the frame data to the display device across a communications interface.

4. The method of claim 1, further comprising:
encrypting the frame data to be transmitted across the communications interface.

5. The method of claim 1, further comprising:
selecting between a compressed transmission format and an uncompressed transmission format based on one or more characteristics of the communications interface.

6. The method of claim 1, wherein the one or more characteristics of the communications interface include a capacity of the communications interface.

7. A non-transitory machine, accessible medium having stored thereon instructions that, when executed by a machine, cause the machine to:
generate frame data from graphics input data;
determine if a display device includes a frame buffer;
send the frame data to the display device for storage in the frame buffer, wherein said sending comprises bypassing storage of the frame data in a local frame buffer and determine an allocation of a processing platform's operations to a plurality of frame buffers in a display device by allocating processes of a first operating system to a first frame buffer and processes of a second operation system to a second frame buffer;
selectively allocate a frame buffer space into a selected number of spaces to implement a selected number of independent frame buffers within said frame buffer space;
save frame buffer contents to a non-volatile storage medium in response to receiving a power state change; and
copy saved contents from said non-volatile storage medium back into the frame buffer of the display device in response to a subsequent power state change.

8. The medium of claim 7, wherein the frame data comprises difference data between a current frame and a previous frame.

9. The medium of claim 7, wherein the instructions, when executed by the machine, further cause the machine to:
transmit the frame data to the display device across a communications interface.

10. The medium of claim 7, wherein the instructions, when executed by the machine, further cause the machine to:
encrypt the frame data to be transmitted across the communications interface.

11. The medium of claim 7, wherein the instructions, when executed by the machine, further cause the machine to:
select between a compressed transmission format and an uncompressed transmission format based on one or more characteristics of the communications interface.

12. A system, comprising:
a processing platform, and a display device;
a non-volatile storage medium coupled to said display device;
wherein the processing platform includes a graphics rendering engine to generate frame data from graphics input data, and a frame buffer control module to determine whether the display device includes a frame buffer, determine an allocation of a processing platform's operations to a plurality of frame buffers in a display device by allocating processes of a first operating system to a first frame buffer and processes of a second operating system to a second frame buffer, and selectively allocate a frame buffer space into a selected number of spaces to implement a selected number of independent frame buffers within said frame buffer space;
wherein, when the display device includes a frame buffer, the frame buffer control module is to bypass storage of the frame data in a local frame buffer, and is to send the frame data to the display device; and
said display device to save frame buffer contents in the non-volatile storage medium in response to receiving a power state change and said display device to copy saved contents from said non-volatile storage medium back into the frame buffer of the display device in response to a subsequent power state change.

13. The system of claim 12, wherein the frame data comprises difference data between a current frame and a previous frame.

14. The system of claim 12, wherein the frame buffer control module is to select between a compressed transmission format and an uncompressed transmission format based on one or more characteristics of a communications interface with the coupled display device.

15. The system of claim 14, wherein the one or more characteristics of the communications interface include a capacity of the communications interface.

16. The system of claim 14, further comprising a communications interface module to transmit the frame data across the communications interface to the coupled display device.

17. The system of claim 14, wherein the communications interface is a Universal Serial Bus (USB) interface.

18. The system of claim 14, wherein the communications interface is a local area network (LAN) interface.

19. The system of claim 12, wherein the frame buffer control module is to encrypt the frame data to be sent to the display device.

* * * * *